US012691493B2

(12) United States Patent
Miyanohara et al.

(10) Patent No.: US 12,691,493 B2
(45) Date of Patent: Jul. 28, 2026

(54) HYDROGEN STORAGE ALLOY

(71) Applicant: MITSUI KINZOKU COMPANY, LIMITED, Tokyo (JP)

(72) Inventors: Keisuke Miyanohara, Takehara (JP); Kyohei Yamaguchi, Takehara (JP)

(73) Assignee: MITSUI KINZOKU COMPANY, LIMITED (JP)

( * ) Notice: Subject to any disclaimer, the term of this patent is extended or adjusted under 35 U.S.C. 154(b) by 817 days.

(21) Appl. No.: 17/918,228

(22) PCT Filed: Apr. 15, 2021

(86) PCT No.: PCT/JP2021/015577
§ 371 (c)(1),
(2) Date: Oct. 11, 2022

(87) PCT Pub. No.: WO2021/220824
PCT Pub. Date: Nov. 4, 2021

(65) Prior Publication Data
US 2023/0142372 A1     May 11, 2023

(30) Foreign Application Priority Data

Apr. 28, 2020     (JP) ................................. 2020-078828

(51) Int. Cl.
| | |
|---|---|
| *B22F 1/00* | (2022.01) |
| *C22C 19/00* | (2006.01) |
| *H01M 4/38* | (2006.01) |
| *H01M 10/30* | (2006.01) |
| *H01M 4/02* | (2006.01) |

(52) U.S. Cl.
CPC .............. *B22F 1/00* (2013.01); *C22C 19/007* (2013.01); *H01M 4/383* (2013.01); *H01M 10/30* (2013.01); *H01M 2004/027* (2013.01); *H01M 2220/20* (2013.01)

(58) Field of Classification Search
CPC .................................................. C22C 19/007
See application file for complete search history.

(56) References Cited

U.S. PATENT DOCUMENTS

| | | | |
|---|---|---|---|
| 5,985,054 A | * | 11/1999 | Tanibuchi ............. C22C 19/007 420/455 |
| 6,106,769 A | * | 8/2000 | Shinya ................... H01M 4/383 429/218.2 |

| | | | |
|---|---|---|---|
| 2005/0255382 A1 | * | 11/2005 | Young .................. H01M 4/364 148/426 |
| 2006/0188385 A1 | | 8/2006 | Daisuke et al. |
| 2013/0157132 A1 | | 6/2013 | Daisuke et al. |
| 2014/0374652 A1 | * | 12/2014 | Young ................... C22C 19/03 252/182.1 |
| 2019/0348671 A1 | | 11/2019 | Keisuke et al. |

FOREIGN PATENT DOCUMENTS

| | | | |
|---|---|---|---|
| JP | H11-204103 | A | 7/1999 |
| JP | 2005133193 | A | 5/2005 |
| JP | 2008-269888 | A | 11/2008 |
| JP | 6608558 | B1 | 11/2019 |
| WO | 2005-014871 | A1 | 2/2005 |
| WO | 2006-085542 | A1 | 8/2006 |
| WO | 2007-040277 | A1 | 4/2007 |
| WO | 2018-123752 | A1 | 7/2018 |

OTHER PUBLICATIONS

S. Vivet et al., "Effects of cobalt replacement by nickel, manganese, aluminum and iron on the crystallographic and electrochemical properties of AB5 type alloys"; Journal of Alloys and Compounds, vol. 356-357; ISSN: 0925-8388; DOI: 10.1016/S0925-8388(03)00087-2; pp. 779-783; Aug. 11, 2003 (total 5 pages).
Hui Guo, "Effects of Stoichiometric Ratio on the Microstructure and Electrochemical Properties of MI0.96Mg0.04 (Ni0.846Co0.014Mn0.08A10.06)x(x=5.0-5.3) Alloys"; Advanced Materials Research (Durnten-Zurich, Switzerland); vol. 1053; ISSN: 1662-8985; DOI: 10.4028/www.scientific.net/AMR.1053.87; retrieved from the internet: https://doi.org/10.4028/www.scientific.net/AMR.1053.87; pp. 87-92; Oct. 31, 2014 (total 8 pages).
Liu, Baozhong et al. "Phase structure and electrochemical properties of La0.7Ce0.3Ni3.75Mn0.35Al0.15Cu0.75-x (Fe0.43B0.57)x hydrogen storage alloys". Journal of Alloys and Compounds 516; 2012 (11 pages).
International Search Report (English and Japanese) issued in PCT/JP2021/015577, mailed Jul. 13, 2021; ISA/JP (5 pages).

* cited by examiner

*Primary Examiner* — Christopher S Kessler
(74) *Attorney, Agent, or Firm* — Harness, Dickey & Pierce, P.L.C.

(57) ABSTRACT

An ABs-type hydrogen storage alloy is provided that has a low Co amount and uses Mm composed of La and Ce, which is capable of preventing a decrease in lifetime characteristics. The hydrogen storage alloy has an ABx composition constituted with an A-site composed of an Mm and a B-site composed of Ni, Co, Mn, and Al, or Ni, Mn, and Al, wherein Mm is composed of La and Ce; the molar ratio of Co is 0.0 or more and 0.11 or less when the molar ratio of Mm is 1.00; the ratio (Al/Mn) of the molar ratio of Al to the molar ratio of Mn is 0.35 to 1.10; and the ratio of the c-axis length to the a-axis length in the $CaCu_5$-type crystal structure is 0.8092 or more.

6 Claims, No Drawings

HYDROGEN STORAGE ALLOY

CROSS REFERENCE TO RELATED APPLICATIONS

This application is a U.S. National Phase Application under 35 U.S.C. 371 of International Application No. PCT/JP2021/015577, filed on Apr. 15, 2021, which claims priority to Japanese Patent Application No. 2020-078828, filed on Apr. 28, 2020. The entire disclosures of the above applications are expressly incorporated by reference herein.

BACKGROUND

Technical Field

The present invention relates to an ABs-type hydrogen storage alloy having a $CaCu_5$-type, that is, an $AB_5$-type crystal structure. Specifically, the present invention relates to a hydrogen storage alloy suitable as a negative electrode active material used for nickel-hydrogen batteries mounted on electric vehicles, hybrid electric vehicles, and other vehicles.

Related Art

A hydrogen storage alloy is an alloy that reacts with hydrogen to form a metal hydride, and since the alloy can reversibly absorb and desorb a large amount of hydrogen at around room temperature, practical utilization thereof as a battery material has been advanced in various fields, such as: nickel-hydrogen batteries (also referred to as "Ni-MH batteries") mounted on electric vehicles (EVs), hybrid electric vehicles (HEVs: motor vehicles using two power sources of an electric motor and an internal combustion engine in combination), and digital still cameras; and fuel cells.

An $AB_5$-type hydrogen storage alloy having a $CaCu_5$-type crystal structure, for example, an alloy using Mm (misch metal) that is a rare earth-based mixture in the A-site and elements such as Ni, Al, Mn, and Co in the B-site (hereinafter, this type of alloy is referred to as "Mm-Ni—Mn—Al—Co alloy") has features that a negative electrode can be composed of relatively inexpensive materials compared with other alloy compositions, and that a closed-type nickel-hydrogen battery with long cycle lifetime and little internal pressure increase due to gases generated during overcharging can be composed.

For this type of $AB_5$-type hydrogen storage alloy, for example, WO 2006/085542 discloses a low Co hydrogen storage alloy having a $CaCu_5$-type crystal structure that can be represented by a general formula $MmNi_aMn_bAl_cCo_d$ (wherein Mm represents a misch metal, $4.0 \leq a \leq 4.7$, $0.30 \leq b \leq 0.65$, $0.20 \leq c \leq 0.50$, $0 < d \leq 0.35$, and $5.2 \leq a+b+c+d \leq 5.5$), wherein the $CaCu_5$-type crystal structure has a crystal lattice having an a-axis length of 499.0 pm or more and a c-axis length of 405.0 pm or more; and in a pressure-composition isothermal chart (PCT curve) at 45° C., equilibrium hydrogen pressure at a hydrogen storage capacity (H/M) of 0.5 is 0.06 MPa or less.

WO 2007/040277 discloses a hydrogen storage alloy having a $CaCu_5$-type crystal structure that can be represented by a general formula $MmNi_aMn_bAl_cCo_dFe_e$ (wherein Mm represents a misch metal including La, $0.2 \leq d \leq 0.5$, $5.025 \leq a+b+c+d+e \leq 5.200$), wherein the content of La in the hydrogen storage alloy is 13 to 27 wt %; and the $CaCu_5$-type crystal structure has a lattice volume of $88.70 \times 10^6$ $(pm^3)$ or less and a full width at half maximum at the (002) plane of 0.29 (°) or less, which are obtained by performing X-ray diffraction measurement and refinement of the lattice constant.

Among the constituent elements of the Mm-Ni—Mn—Al—Co alloy, Co is an important element that suppresses the atomization of the alloy and exerts an effect on improving the lifetime characteristics. However, Co is a very expensive metal, and it is thus desired to reduce Co. Since reducing Co leads to a decrease in output characteristics and lifetime characteristics, it has been required to reduce Co while maintaining output characteristics and lifetime characteristics.

In view of such a problem, various proposals to reduce Co amount and still maintain battery characteristics such as output characteristics and lifetime characteristics have been disclosed.

For example, WO 2005/014871 discloses a low Co hydrogen storage alloy having a $CaCu_5$-type crystal structure that can be represented by a general formula $MmNi_aMn_bAl_cCo_d$ (wherein Mm represents a misch metal, $4.0 \leq a \leq 4.7$, $0.3 \leq b \leq 0.65$, $0.2 \leq c \leq 0.5$, $0 < d \leq 0.35$, and $5.2 \leq a+b+c+d \leq 5.5$), wherein the $CaCu_5$-type crystal structure has a crystal lattice having an a-axis length of 499 pm or more and a c-axis length of 405 pm or more, as a hydrogen storage alloy having an extremely low Co content and capable of maintaining the high levels of output characteristics (particularly pulse discharge characteristics), activity (degree of activity), and lifetime characteristics.

WO 2018/123752 discloses a hydrogen storage alloy having a parent phase having a $CaCu_5$-type, that is, an AB5-type crystal structure, wherein the A-site is constituted from a rare earth element containing La; and the B-site does not contain Co and contains at least Ni, Al, and Mn, with the ratio (Mn/Al) of the content of Mn (molar ratio) to the content of Al (molar ratio) being 0.60 or more and less than 1.56, and the ratio (La/(Mn+Al)) of the content of La (molar ratio) to the total content of the content of Al (molar ratio) and the content of Mn (molar ratio) being more than 0.92.

Among the constituent elements of the Mm-Ni—Mn—Al—Co alloy, Mm, along with Co, has also been one of the factors that hinder the reduction of the price of the hydrogen storage alloy.

Mm, which has been generally used so far, is a mixture of rare earth elements such as La, Ce, Pr, Nd, and Sm. By replacing this with Mm composed of La and Ce, it is possible to reduce the price. In that case, however, there has been a problem that the lifetime characteristics are deteriorated. It has been very hard to maintain the lifetime characteristics, especially when the Co amount is lowered and Mm composed of La and Ce is used.

Thus, the present invention relates to an Mm-Ni—Mn—Al—Co alloy-based $AB_5$-type hydrogen storage alloy, and an object of the present invention is provide a novel hydrogen storage alloy that has a low Co amount and uses Mm composed of La and Ce, which is capable of preventing a decrease in lifetime characteristics of batteries when used as a negative electrode active material for nickel-hydrogen batteries.

SUMMARY

The present invention proposes a hydrogen storage alloy having a parent phase having a $CaCu_5$-type, that is, an $AB_5$-type crystal structure, wherein the hydrogen storage alloy has an ABx composition constituted with an A-site containing a misch metal (referred to as "Mm") and a B-site containing Ni, Co, Mn, and Al, or Ni, Mn, and Al, and wherein Mm is composed of La and Ce; a molar ratio of Co is 0.0 or more and 0.11 or less when a molar ratio of Mm is 1.00; a ratio (Al/Mn) of a molar ratio of Al to a molar ratio of Mn is 0.35 to 1.10; and a ratio of a c-axis length to an a-axis length in the $CaCu_5$-type crystal structure is 0.8092 or more.

EFFECT OF THE INVENTION

The hydrogen storage alloy proposed by the present invention, even when having sufficiently low Co amount and using Mm composed of La and Ce, is capable of preventing a decrease in lifetime characteristics of batteries when used as a negative electrode active material for nickel-hydrogen batteries. Accordingly, the hydrogen storage alloy proposed by the present invention can be suitably used as a negative electrode active material for nickel-hydrogen batteries mounted on electric vehicles and hybrid electric vehicles.

DETAILED DESCRIPTION

Next, the present invention will be described on the basis of embodiments. The present invention is not limited to the embodiments described below.
<Present Hydrogen Storage Alloy>
The hydrogen storage alloy of the present embodiment (hereinafter, referred to as "present hydrogen storage alloy") is a hydrogen storage alloy having a parent phase having a $CaCu_5$-type crystal structure with a space group of International Table Number 191 (P6/mmm), that is, an $AB_5$-type crystal structure.
(Composition)
The present hydrogen storage alloy is an alloy having an ABx composition in which the A-site is constituted with a misch metal (referred to as "Mm") and the B-site is constituted with Ni, Co, Mn, and Al, or Ni, Mn, and Al. That is, the present hydrogen storage alloy is an $AB_5$-type hydrogen storage alloy that can be represented by, for example, a general formula: $MmNi_aMn_bAl_cCo_d$ (wherein Mm represents a misch metal; and a, b, c, and d each represents a molar ratio of the elements when the molar ratio of Mm is 1.00, and is a numerical value of 0.0 or more).

Mm is composed of La and Ce.

The Ce content ratio in Mm is preferably 13% by mass or more, more preferably 15% by mass or more, and even more preferably 17% by mass or more, from the viewpoint of lifetime characteristics. On the other hand, from the viewpoint of output characteristics, it is preferably 24% by mass or less, more preferably 22% by mass or less, and even more preferably 20% by mass or less.

For Co, from the viewpoint of cost reduction, the molar ratio of Co when the molar ratio of Mm constituting the A-site is 1.00, that is, the molar ratio (d) of Co in the above-mentioned general formula is preferably 0.0 or more and 0.11 or less. Above all, it is more preferably 0.09 or less, even more preferably 0.06 or less, still more preferably 0.05 or less, furthermore preferably 0.03 or less, and particularly preferably not contained.

In the present hydrogen storage alloy, the ratio (Al/Mn) of the molar ratio of Al to the molar ratio of Mn, when the molar ratio of Mm constituting the A-site is 1.00, is preferably 0.35 to 1.10.

In the case where the present hydrogen storage alloy is used as a negative electrode active material for nickel-hydrogen batteries, one solution to prevent a decrease in lifetime characteristics of the battery is to suppress corrosion when the present hydrogen storage alloy comes into contact with an electrolyte solution (alkali aqueous solution). For that purpose, it is found that, in the hydrogen storage alloy having sufficiently low Co amount and using Mm composed of La and Ce, the ratio (Al/Mn) of the Al amount to the Mn amount is preferably adjusted within a predetermined range.

From such a viewpoint, the ratio (Al/Mn) of the molar ratio of Al to the molar ratio of Mn in the present hydrogen storage alloy is preferably 0.35 or more, more preferably 0.45 or more, even more preferably 0.50 or more, and still more preferably 0.54 or more. On the other hand, it is preferably 1.10 or less, more preferably 1.05 or less, even more preferably 0.97 or less, and still more preferably 0.88 or less.

In the present hydrogen storage alloy, the total molar ratio of the elements constituting the B-site (that is, "a+b+c+d" in the above-mentioned formula, also referred to as "ABx") when the molar ratio of Mm constituting the A-site in the ABx composition is 1.00, is not particularly limited.

For example, from the viewpoint of using the alloy as a negative electrode active material for Ni-MH batteries to be mounted on electric vehicles (referred to as "EVs") and hybrid electric vehicles (referred to as "HEVs"), the total molar ratio preferably satisfies $5.28 \le ABx \le 5.46$. Above all, from the viewpoint of suppressing cracking of the hydrogen storage alloy particles due to repeated hydrogen absorption by increasing ABx, ABx is more preferably 5.29 or more, even more preferably 5.30 or more, and particularly preferably 5.31 or more. On the other hand, since ABx is preferably not too high from the viewpoint of output characteristics, ABx is more preferably 5.45 or less, even more preferably 5.44 or less, and particularly preferably 5.43 or less.

In the present hydrogen storage alloy, the molar ratios of Ni, Mn, and Al are not particularly limited from the viewpoint of solving the problems of the present invention. However, from the viewpoint of using the alloy as a negative electrode active material for Ni-MH batteries mounted on EVs and HEVs, the molar ratios can be considered as follows.

For Ni, the molar ratio of Ni when the molar ratio of Mm constituting the A-site is 1.00, that is, the molar ratio (a) of Ni in the above-mentioned general formula is preferably 4.45 or more and 4.64 or less, more preferably 4.47 or more or 4.63 or less, and particularly preferably 4.48 or more or 4.61 or less.

For Mn, the molar ratio (b) of Mn in the above-mentioned general formula is preferably 0.39 or more and 0.60 or less, more preferably 0.41 or more or 0.57 or less, and particularly preferably 0.43 or more or 0.53 or less.

For Al, the molar ratio (c) of Al in the above-mentioned general formula is preferably 0.21 or more and 0.43 or less, more preferably 0.25 or more or 0.41 or less, and even more preferably 0.28 or more or 0.39 or less.

The present hydrogen storage alloy is allowed to contain impurities to the extent that they do not affect the effect of the present invention. For example, impurities of any of Ti, Mo, W, Si, Ca, Pb, Cd, and Mg may be contained as long as the content thereof is approximately 0.05% by mass or less.

The content or composition ratio of each element in the present hydrogen storage alloy can be obtained from chemical composition analysis measurement.

When the hydrogen storage alloy is used as a negative electrode active material for Ni-MH batteries mounted on EVs and HEVs, the molar ratios of Al and Mn change slightly in the process of producing and using batteries, and the amount of change is known to be within approximately 0.03 molar ratio. Therefore, by collecting and analyzing a negative electrode active material from a used Ni-MH battery, it is possible to estimate the element molar ratio of the hydrogen storage alloy in the state prior to use in the battery.

<Crystal Structure>

In the case where the present hydrogen storage alloy is used as a negative electrode active material for nickel-hydrogen batteries, one solution to prevent a decrease in lifetime characteristics of the battery is to suppress cracking of the hydrogen storage alloy particles even after repeated hydrogen absorption. For that purpose, it is preferable to optimize the crystal structure so as to withstand the expansion and contraction associated with the hydrogen absorption.

From such a viewpoint, in the present hydrogen storage alloy, the ratio of the c-axis length to the a-axis length in the $CaCu_5$-type crystal structure is preferably 0.8092 or more, more preferably 0.8098 or more, and even more preferably 0.8100 or more. On the other hand, from the viewpoint of the output characteristics affected by the cracking of the alloy, it is preferably 0.8200 or less, more preferably 0.8115 or less, and even more preferably 0.8110 or less.

In the present invention, the a-axis length and the c-axis length of the hydrogen storage alloy can be obtained from powder X-ray diffraction measurement.

In this case, as for the particle size of the powder for powder X-ray diffraction measurement, a sieving product obtained by sieving a powder having a size of –500 μm (particle size passing through a mesh of 500 μm) and further sieving with a mesh opening of 20 μm, that is, a powder having a size of –20 μm is used as a measurement sample. In the case where the amount of the measurement sample is insufficient only by the sieving, the powder of –500 μm may be pulverized to obtain a powder of –20 μm for the purpose of obtaining the necessary amount of powder for the measurement.

When pulverizing, it is necessary to pulverize the alloy under the conditions that the crystal structure of the hydrogen storage alloy is unchanged. Therefore, it is preferable to measure the a-axis length, the c-axis length, and the lattice volume under conditions with and without pulverizing, respectively, and compare the two to confirm that the pulverizing conditions are equivalent.

The a-axis length and the c-axis length described above are values obtained by measuring the X-ray diffraction as in Examples described later, and analyzing with Fundamental Parameter, as in the analysis in Examples described later, by the Powerley method.

Furthermore, in the case where the present hydrogen storage alloy is used as a negative electrode active material for nickel-hydrogen batteries, one solution to prevent a decrease in lifetime characteristics of the battery is to improve the corrosion resistance of the alloy itself to an electrolyte solution. For that purpose, it is preferable to suppress corrosion to a strong alkali solution.

From such a viewpoint, the present hydrogen storage alloy preferably has a magnetization of 1.60 emu/g or less, more preferably 1.50 emu/g or less, even more preferably 1.45 emu/g or less, and still more preferably 1.40 emu/g or less, after performing a surface treatment. The surface treatment is performed by immersing a hydrogen storage alloy powder having a particle diameter adjusted such that a 50% volume cumulative particle diameter (D50) is 21 μm±2 μm, into a 31% by mass KOH solution having a liquid temperature of 120° C. for 3 hours.

Here, the "surface treatment of immersing into a 31% by mass KOH solution having a liquid temperature of 120° C.

for 3 hours" is meant as an alternative reaction to the corrosion reaction by the electrolyte solution. The surface treatment forms a Ni-rich layer on the surface of the hydrogen storage alloy, which increases the magnetization. Therefore, when the magnetization after the surface treatment is high, it means that the alloy is easily affected by the surface treatment and is easily corroded by the electrolyte solution.

The 50% volume cumulative particle diameter (D50) is a 50% volume cumulative particle diameter (D50) by a laser diffraction scattering-type particle size distribution measurement method, and means a diameter at a accumulation of 50% from the finer side in a cumulative percentage representation of particle diameter measurement values in terms of volume in a chart of a volume-based particle size distribution.

In the present hydrogen storage alloy, the ratio of the c-axis length to the a-axis length and the magnetization after alkali treatment can be adjusted by changing the composition ratio, changing the cooling method after casting and its conditions, and changing the heat treatment conditions. However, it is not limited to these.

<Method for Producing Present Hydrogen Storage Alloy>

The present hydrogen storage alloy can be obtained in a thin flake-shape or a thin strip-shape by, for example, weighing and mixing hydrogen storage alloy raw materials so as to be a predetermined alloy composition, melting the hydrogen storage alloy raw materials using, for example, a high-frequency heating and melting furnace by induction heating to form a molten metal, cooling the molten metal by casting on a rotating roll, subjecting the cast metal to heat treatment, and then pulverizing and classifying the heat-treated cast metal as needed.

However, the method for producing the present hydrogen storage alloy is not limited to such a production method.

(Melting)

In melting the hydrogen storage alloy raw materials to form a molten metal as described above, the temperature of the molten metal is preferably 1,300° C. to 1,600° C., more preferably 1,350° C. or higher or 1,550° C. or lower, and even more preferably 1,400° C. or higher or 1,500° C. or lower.

(Cooling)

In casting the molten metal on a rotating roll as described above, the rotation speed of the roll is preferably 50 to 200 rpm, more preferably 55 rpm or more or 190 rpm or less, and even more preferably 60 rpm or more or 180 rpm or less, from the viewpoint of the cooling rate of the molten metal and the thickness of the foil.

(Heat Treatment)

The atmosphere in the heat treatment is preferably inert gas, such as Ar and $N_2$.

The temperature in the heat treatment is controlled as follows: the alloy is subjected to a heat treatment of maintaining a temperature of 900° C. to 1,100° C. (referred to as "heat treatment temperature") for 1 to 10 hours, and cooled to 500° C. at a temperature lowering rate of 10° C./min to 30° C./min and then naturally cooled to 100° C. or lower. Furthermore, the heat treatment and cooling under the same conditions as described above are preferably performed twice or three times or more.

In the above heat treatment, one heat-treatment time is preferably 1 hour or more and 10 hours or less, more preferably 2 hours or more or 8 hours or less, and even more preferably 2 hours or more or 6 hours or less.

Further, the alloy may be subjected to pulse control of repeating temperature control cycles at a predetermined interval as needed, in which the alloy is heated to a temperature of 900° C. to 1,100° C. (referred to as "heat treatment central temperature"); the temperature is raised from the heat treatment central temperature and returned to the heat treatment central temperature in a short time; and the temperature is then lowered from the heat treatment central temperature and returned to the heat treatment central temperature in a short time.

In such pulse control, it is preferable to raise and lower the temperature by 2° C. to 10° C., more preferably 2° C. to 8° C., and even more preferably 2° C. to 5° C., from the heat treatment central temperature.

In the above pulse control, the temperature raising/lowering rate is preferably 0.1° C./min to 1.0° C./min, more preferably 0.1° C./min to 0.8° C./min, and even more preferably 0.2° C./min or more or 0.5° C./min or less.

The heat treatment time in the above pulse control, that is, the total heat treatment time is preferably 1 to 10 hours, more preferably 2 hours or more or 8 hours or less, and even more preferably 2 hours or more or 5 hours or less.

After the heat treatment under such pulse control, it is preferred that the alloy is cooled to 500° C. at a temperature lowering rate of 10° C./min to 30° C./min and then naturally cooled to 100° C. or lower.

(Pulverization and Classification)

The resulting hydrogen storage alloy in a thin flake-shape or a thin strip-shape is preferably pulverized, for example, to a particle size (−500 μm) capable of passing through a mesh of 500 μm. However, the pulverizing may be performed to a particle size (−1,000 μm) capable of passing through a mesh of 1,000 μm, or a particle size (−850 μm) capable of passing through a mesh of 850 μm, as needed.

The alloy may be pulverized to some extent. However, magnetic separation efficiency is reduced when the alloy is excessively finely pulverized in this stage, and thus it is preferably coarsely crushed such that a coarse powder that is larger than 150 pm is contained in an amount of 50% by mass or more.

<Utilization of Present Hydrogen Storage Alloy>

The present hydrogen storage alloy can be subjected to magnetic separation treatment as needed and then utilized as a negative electrode material for batteries. That is, if a large number of impurities are contained in the present hydrogen storage alloy, the impurities may not only reduce hydrogen storage capacity but also may be eluted into an electrolyte solution (alkali solution) and pass through a separator, leading to a short circuit (voltage drop), when charge and discharge are repeated under severe conditions such as over discharge. Therefore, it is preferred to perform magnetic separation treatment as needed to eliminate the impurities leading to a short circuit.

However, the present hydrogen storage alloy can also be utilized as a negative electrode material for batteries without performing magnetic separation treatment.

When the present hydrogen storage alloy is utilized as a negative electrode material for batteries, a negative electrode for batteries can be prepared by, for example, a known method after the alloy is subjected to magnetic separation treatment as needed. That is, a hydrogen storage alloy negative electrode can be formed by mixing a binder, a conductive auxiliary agent, and the like with the present hydrogen storage alloy and molding the mixture by a known method.

The hydrogen storage alloy negative electrode thus obtained, that is, the hydrogen storage alloy negative electrode obtained by mixing a binder, a conductive auxiliary agent, and the like with the present hydrogen storage alloy and molding the mixture by a known method can be utilized for primary batteries (including fuel batteries) in addition to secondary batteries. For example, a Ni-MH battery can be formed from the hydrogen storage alloy negative electrode, a positive electrode using nickel hydroxide as an active material, an electrolyte solution made of an alkali aqueous solution, and a separator.

Particularly, the present hydrogen storage alloy is excellent in corrosion resistance and is capable of enhancing the lifetime characteristics without reducing the output, and thus the present hydrogen storage alloy can be particularly suitably used as a Ni-MH battery mounted on EVs, HEVs, and other vehicles requiring these characteristics.

<Explanation of Terms>

In the case of being expressed as the term "α to β" (α and β are arbitrary numbers) in the present specification, unless otherwise stated, the term includes the meaning of "preferably more than α" or "preferably less than β" along with the meaning "not less than α and not more than β".

Further, in the case of being expressed as the term "α or more" or "α≤" (α is an arbitrary number), or the term "β or less" or "≤β" (β is an arbitrary number), the term also includes the intention of being "preferably more than α" or "preferably less than β".

EXAMPLES

Next, the present invention will be further described based on Examples. The present invention is not limited to the following Examples.

Example 1

Raw materials were weighed and mixed so as to be Mm: 31.27, Ni: 59.32, Co: 0.66, Mn: 7.40, and Al: 1.35 in terms of the mass ratio of each element.

Here, a material composed of La and Ce was used as Mm.

The resulting mixture was charged into a crucible, and the crucible was fixed in a high-frequency melting furnace. The pressure in the furnace was reduced to $10^{-4}$ to $10^{-5}$ Torr, argon gas was then introduced therein, and the mixture was heated to 1,500° C. in an argon gas atmosphere to obtain a molten metal. Next, 15 kg of the molten metal was cooled by casting on a copper roll rotating at 80 rpm to obtain a hydrogen storage alloy in a thin strip-shape.

Further, the resulting hydrogen storage alloy was placed into a stainless steel container, the container was set in a vacuum heat treatment apparatus, and the alloy was heat-treated in an argon gas atmosphere to obtain a hydrogen storage alloy in a thin flake-shape.

In the heat treatment, the alloy was subjected to high-temperature maintaining treatment such that the temperature was raised to 913° C. for 1 hour in an argon gas atmosphere, further raised to 1,068° C. for 30 minutes and to 1,078° C. for 10 minutes, and maintained at 1,078° C. for 5 hours. Subsequently, the alloy was cooled to 500° C. at a temperature lowering rate of 20° C./min, and then naturally cooled to 100° C. or lower.

Next, the resulting hydrogen storage alloy was pulverized to a particle size (−500 μm) capable of passing through a mesh of 500 μm in an argon gas atmosphere using a brown mill (model 1025-HBG) manufactured by Yoshida Sei-sakusho Co., Ltd., thereby obtaining a hydrogen storage alloy (sample).

The resulting hydrogen storage alloy (sample) was confirmed to be $MmNi_{4.50}Al_{0.22}Co_{0.05}Mn_{0.60}$ (ABx=5.369) by ICP analysis.

Example 2

A hydrogen storage alloy (sample) was obtained in the same manner as in Example 1 except that the mass ratio of each element when mixing the raw materials in Example 1 was changed to Mm: 31.38, Ni: 60.16, Co: 0.00, Mn: 6.79, and Al: 1.67 as shown in Table 1.

Example 3

A hydrogen storage alloy (sample) was obtained in the same manner as in Example 1 except that the mass ratio of each element when mixing the raw materials in Example 1 was changed to Mm: 31.45, Ni: 60.33, Co: 0.00, Mn: 6.31, and Al: 1.91 as shown in Table 1.

Example 4

A hydrogen storage alloy (sample) was obtained in the same manner as in Example 1 except that the mass ratio of each element when mixing the raw materials in Example 1 was changed to Mm: 31.47, Ni: 60.36, Co: 0.00, Mn: 6.19, and Al: 1.98 as shown in Table 1.

Example 5

A hydrogen storage alloy (sample) was obtained in the same manner as in Example 1 except that the mass ratio of each element when mixing the raw materials in Example 1 was changed to Mm: 31.49, Ni: 60.40, Co: 0.00, Mn: 6.07, and Al: 2.04 as shown in Table 1.

Example 6

A hydrogen storage alloy (sample) was obtained in the same manner as in Example 1 except that the mass ratio of each element when mixing the raw materials in Example 1 was changed to Mm: 31.49, Ni: 59.73, Co: 0.67, Mn: 6.07, and Al: 2.04 as shown in Table 1.

Example 7

A hydrogen storage alloy (sample) was obtained in the same manner as in Example 1 except that the mass ratio of each element when mixing the raw materials in Example 1 was changed to Mm: 31.60, Ni: 60.61, Co: 0.00, Mn: 5.40, and Al: 2.39 as shown in Table 1.

Example 8

A hydrogen storage alloy (sample) was obtained in the same manner as in Example 1 except that the mass ratio of each element when mixing the raw materials in Example 1 was changed to Mm: 31.64, Ni: 60.69, Co: 0.00, Mn: 5.15, and Al: 2.52 as shown in Table 1.

Example 9

A hydrogen storage alloy (sample) was obtained in the same manner as in Example 1 except that the mass ratio of each element when mixing the raw materials in Example 1 was changed to Mm: 31.28, Ni: 60.67, Co: 0.00, Mn: 6.03, and Al: 2.02 as shown in Table 1.

Example 10

A hydrogen storage alloy (sample) was obtained in the same manner as in Example 1 except that the mass ratio of each element when mixing the raw materials in Example 1 was changed to Mm: 31.71, Ni: 60.13, Co: 0.00, Mn: 6.11, and Al: 2.05 as shown in Table 1.

Example 11

A hydrogen storage alloy (sample) was obtained in the same manner as in Example 1 except that in Example 1, the mass ratio of each element when mixing the raw materials was changed to Mm: 31.63, Ni: 59.49, Co: 1.34, Mn: 5.39, and Al: 2.15 as shown in Table 1, and the casting method was changed to a bookshell-type copper mold casting. In other words, instead of the method in which "the resulting mixture was charged into a crucible, the crucible was fixed in a high-frequency melting furnace, the pressure was reduced to $10^{-4}$ to $10^{-5}$ Torr, argon gas was introduced therein, the mixture was heated to 1,500° C. in an argon gas atmosphere to obtain a molten metal, and 15 kg of the molten metal was then cooled by casting on a copper roll rotating at 80 rpm" in Example 1, the resulting mixture was charged into a crucible, the crucible was fixed in a high-frequency melting furnace, the pressure was reduced to $10^{-4}$ to $10^{-5}$ Torr, argon gas was introduced therein, the mixture was heated to 1,450° C. in an argon gas atmosphere to obtain a molten metal, and 10 kg of the molten metal was poured into a copper mold (bookshell-type copper mold) having a total weight of 200 kg at 4 kg/sec to obtain a hydrogen storage alloy (sample).

Example 12

A hydrogen storage alloy (sample) was obtained in the same manner as in Example 1 except that the mass ratio of each element when mixing the raw materials in Example 11 was changed to Mm: 31.51, Ni: 59.48, Co: 1.07, Mn: 5.94, and Al: 2.00 as shown in Table 1.

Comparative Example 1

A hydrogen storage alloy (sample) was obtained in the same manner as in Example 1 except that the mass ratio of each element when mixing the raw materials in Example 1 was changed to Mm: 30.84, Ni: 59.15, Co: 0.00, Mn: 10.01, and Al: 0.00 as shown in Table 1.

Comparative Example 2

A hydrogen storage alloy (sample) was obtained in the same manner as in Example 1 except that in Example 1, the mass ratio of each element when mixing the raw materials was changed to Mm: 30.84, Ni: 59.15, Co: 0.00, Mn: 10.01, and Al: 0.00 as shown in Table 1, and the casting method was changed to a bookshell-type copper mold casting.

Comparative Example 3

A hydrogen storage alloy (sample) was obtained in the same manner as in Example 1 except that in Example 1, the mass ratio of each element when mixing the raw materials was changed to Mm: 31.27, Ni: 59.98, Co: 0.00, Mn: 7.40, and Al: 1.35 as shown in Table 1, and the casting method was changed to a Cu mold casting.

Comparative Example 4

A hydrogen storage alloy (sample) was obtained in the same manner as in Example 1 except that in Example 1, the mass ratio of each element when mixing the raw materials was changed to Mm: 31.64, Ni: 60.69, Co: 0.00, Mn: 5.15, and Al: 2.52 as shown in Table 1, and the casting method was changed to a Cu mold casting.

Comparative Example 5

A hydrogen storage alloy (sample) was obtained in the same manner as in Comparative Example 1 except that in Comparative Example 1, the heat treatment temperature was changed to 1,028° C.

<Evaluation Method>

The hydrogen storage alloy powder (sample) obtained in each of Examples and Comparative Examples was subjected to various evaluations as follows.

<Measurement of A-Axis Length and C-Axis Length>

The hydrogen storage alloy (sample) obtained in each of Examples and Comparative Examples was classified using a sieve having an opening of 20 μm to obtain a hydrogen storage alloy powder (measurement sample) having a size of –20 μm (particle size passing through a mesh of 20 μm).

The resulting measurement sample was filled in a sample holder, and the measurement was performed using an X-ray diffraction apparatus (D8 ADVANCE, manufactured by Bruker AXS) to determine the a-axis length, the c-axis length, and the lattice volume. The hydrogen storage alloy (sample) prepared in the same way was measured three times for n-numbers, and the average value was determined.

The specification of the X-ray diffraction apparatus used and the conditions were as follows.

```
                (Apparatus Specification)
            Tube: CuKα ray
                - Incident Beam Pass
            [Tube-mount]
                Voltage: 40 [kV]
                Current: 40 [mA]
                Element: Cu
            [Optics_Primary_Mortorized Slit]
                Opening: 0.30 [°]
            [Slit Mount]
                No Slit 10.5 [mm] 10.5 [mm]
                Width: 18 [mm]
                Height: 10.5 [mm]
                Deflection: 0 [°]
            [Soller Mount]
                Axial Soller 2.5 [°] 2.5 [°]
                Axial Divergence: 2.5 [°]
                Equatoril Divergence: 0 [°]
                Deflection: 0 [°]
                - Light Receiving Side Beam Pass
            Detector: LYNXEYE XE
            [LYNXEYE_XE]
                Mode: LYNXEYE_XE (1D mode)
                Deflection: 0 [°]
                Activaton Limit: 200000 [1/s]
                Deactivaton Limit: 150000 [1/s]
                Lower Discriminator: 0.212 [V]
                Bining: 1
                Counter 1D: 0 [counts]
                Scan Counter: 0 [counts]
                Counter 0D: 0 [counts]
                Upper Discriminator: 0.230 [V]
                Orientation: 0 [°]
            [Detector Optics Mount 2]
                Soller_25 2.5 [°] 2.5 [°]
                Axial Divergence: 2.5 [°]
                Equatoril Divergence: 0 [°]
                Deflection: 0 [°]
            [Detector Optics Mount 1]
                Slit_Open_1 0 [mm] 0 [mm]
                Width: 14 [mm]
                Height: 0 [mm]
```

-continued

```
                Deflection: 0 [°]
            [Soller Mount]
                Deflection: 0 [°]
            [Slit Mount]
                No Slit 10.5 [mm] 10.5 [mm]
                Width: 18 [mm]
                Height: 10.5 [mm]
                Deflection: 0 [°]
```

```
                (Measurement Conditions)
            Measurement mode: Two Theta/Theta
            Mode: PSD high speed scanning
            Time ·/step: 0.280 [s]
            Start: 20.0000 [°]
            Stop: 120.0046 [°]
            Step width: 0.007175469952
```

The X-ray diffraction patterns obtained by the measurements (in the range of diffraction angle $2\theta=20°$ to) $120°$ were analyzed using an analysis software (software name: Topas Version 5).

For the analysis, Fundamental Parameter was employed, Space group: P6/mmm was selected, and refinement was performed by the Powerley method with the a-axis length, c-axis length, and Crystal size-L as variables.

Peaks of the X-ray diffraction patterns used in the analysis were as follows.

A peak indexed by a Miller index of (010) present around 20.5°

A peak indexed by a Miller index of (001) present around 21.9°

A peak indexed by a Miller index of (011) present around 30.1°

A peak indexed by a Miller index of (110) present around 35.8°

A peak indexed by a Miller index of (020) present around 41.6°

A peak indexed by a Miller index of (111) present around 42.4°

A peak indexed by a Miller index of (002) present around 44.6°

A peak indexed by a Miller index of (021) present around 47.5°

A peak indexed by a Miller index of (012) present around 49.5°

A peak indexed by a Miller index of (210) present around 56.1°

A peak indexed by a Miller index of (112) present around 58.5°

A peak indexed by a Miller index of (211) present around 60.9°

A peak indexed by a Miller index of (022) present around 62.6°

A peak indexed by a Miller index of (030) present around 64.4°

A peak indexed by a Miller index of (031) present around 68.9°

A peak indexed by a Miller index of (003) present around 69.4°

A peak indexed by a Miller index of (013) present around 73.2°

A peak indexed by a Miller index of (212) present around 74.3°

A peak indexed by a Miller index of (220) present around 76.0°

A peak indexed by a Miller index of (310) present around 79.7°

A peak indexed by a Miller index of (221) present around 80.2°

A peak indexed by a Miller index of (113) present around 80.7°

A peak indexed by a Miller index of (032) present around 81.8°

A peak indexed by a Miller index of (311) present around 83.9°

A peak indexed by a Miller index of (023) present around 84.3°

A peak indexed by a Miller index of (040) present around 90.6°

A peak indexed by a Miller index of (222) present around 92.7°

A peak indexed by a Miller index of (041) present around 94.7°

A peak indexed by a Miller index of (213) present around 95.2°

A peak indexed by a Miller index of (312) present around 96.3°

A peak indexed by a Miller index of (004) present around 98.8°

A peak indexed by a Miller index of (320) present around 101.5°

A peak indexed by a Miller index of (014) present around 102.5°

A peak indexed by a Miller index of (033) present around 102.6°

A peak indexed by a Miller index of (321) present around 105.8°

A peak indexed by a Miller index of (042) present around 107.4°

A peak indexed by a Miller index of (410) present around 109.0°

A peak indexed by a Miller index of (114) present around 110.0°

A peak indexed by a Miller index of (411) present around 113.4°

A peak indexed by a Miller index of (024) present around 113.9°

A peak indexed by a Miller index of (223) present around 114.0°

A peak indexed by a Miller index of (313) present around 118.0°

A peak indexed by a Miller index of (322) present around 119.2°

<Specific Surface Area Increase Amount>

The hydrogen storage alloy (sample) obtained in each of Examples and Comparative Examples in an amount of 20 g was pulverized using a cyclomill ((model 1033-200), manufactured by Yoshida Seisakusho Co., Ltd.) for 30 seconds, and sieved using sieves having a mesh of 20 μm and a mesh of 53 μm to adjust the D50 to 45 μm±0.5 μm, thereby obtaining a measurement sample. The CS value (specific surface area) was also measured at the same time as the D50.

The CS value was a specific surface area calculated from the measured particle diameter, assuming that the particles were spherical.

The D50 and the CS value (specific surface area) were determined from a chart of the volume-based particle size distribution obtained by measuring under the following condition settings using a particle size distribution measuring apparatus (Microtrac HRA 9320-X100, manufactured by Nikkiso Co., Ltd.).

(Set-Zero time): 30 sec (Measurement time): 30 sec (Number of measurements): 1 time (Solvent and refractive index): Water, 1.33

(Particle condition permeability): Reflection (Flow rate): 60 ml/sec

The resulting measurement sample in an amount of 2 g was then placed into a PCT holder, and subjected to the following activation treatment using an activation apparatus.

Activation treatment: The PCT holder was vacuumed for 1 hour while heating in a mantle heater (300° C.), 1.75 MPa of hydrogen was introduced therein, and the PCT holder was left for stand for 30 minutes and then vacuumed. The above series of operations were performed twice.

Next, the PCT holder was taken out from the mantle heater, connected to a PCT characteristic measuring apparatus (Suzuki Shokan Co., Ltd.), placed into a constant temperature bath at 45° C., vacuumed for 45 minutes, and then subjected to hydrogen absorption-desorption cycle under the following condition settings.

(Introduced pressure) 2.9 MPa (Absorption time) 300 sec (Desorption time) 420 sec (Number of cycles) 10 cycles After 10 cycles, the PCT holder was vacuumed for 30 minutes, and the sample was then taken out from the PCT holder to obtain a sample after 10 cycles.

The CS value of the sample after 10 cycles (specific surface area, referred to as "CS value after cycle") was measured in the same manner as the CS value of the hydrogen storage alloy (sample) obtained in each of Examples and Comparative Examples (specific surface area, referred to as "CS value before cycle"), and the specific surface area increase amount was determined by the following formula.

$$\text{Specific surface area increase amount } (\Delta CS) = \qquad \text{(Formula)}$$
$$(CS \text{ value after cycle} - CS \text{ value before cycle})$$

<Measurement of Magnetization After 3 Hours of Alkali Treatment>

The hydrogen storage alloy (sample) obtained in each of Examples and Comparative Examples in an amount of 20 g was pulverized using a cyclomill ((model 1033-200), manufactured by Yoshida Seisakusho Co., Ltd.) for 1 minute, and classified using a sieve having an opening of 32 μm to adjust the D50 to 21 μm±2 μm, thereby obtaining a hydrogen storage alloy powder (measurement sample).

The D50 was determined from a chart of the volume-based particle size distribution obtained by measuring under the following condition settings using a particle size distribution measuring apparatus (Microtrac HRA 9320-X100, manufactured by Nikkiso Co., Ltd.).

(Set-Zero time): 30 sec (Measurement time): 30 sec (Number of measurements): 1 time (Solvent and refractive index): Water, 1.33

(Particle condition permeability): Reflection (Flow rate): 60 ml/sec

The resulting measurement sample in an amount of 3 g was charged into 30 ml of a KOH aqueous solution having a concentration of 31% by mass and a liquid temperature of 120° C., and shaken using a shaker for 3 hours for alkali treatment. The sample was then washed with water, filtered, and dried to obtain a measurement sample.

The resulting sample was measured for a hysteresis loop using a VSM (Vibration Sample Magnetometer: "TM-VSM1014-MRO-M-type" manufactured by Tamakawa Co., Ltd., electromagnet: TM-WTF51.406-101.5 FA-type, sample holder: TM-VSMSH-21-3-type, sample container: TM-VSMPCA-C-type), thereby measuring the magnetization.

Before the above measurement, the hydrogen storage alloy (sample) obtained in each of Examples and Comparative Examples was subjected to calibration using a standard sample (Ni at 99.998% purity), and the apparatus was calibrated to confirm that it was in normal condition. The magnetization was then measured as described above.
(Measurement Conditions of Vibration Sample Magnetometer)

Max magnetic field: 10 (kOe)
  Time constant lock-in amp: 100 (msec)
  Measuring method: sweep {speed 1: 5 sec/1 kOe, speed 2: 10 sec/1 kOe (1 to −1 [kOe])}
  Angle: fix 0 [°]
  Gap of pole chips: 14 mm
  Measuring loop: half The magnetization was determined from the obtained hysteresis loop as follows.

$$\text{Magnetization (emu/g)} = \{M(10) - 2\{M(10) - M(5)\}\}/\text{Measured alloy weight}$$

wherein M(10) represents the magnetization when the x-axis is 10 [kOe], and M(5) represents the magnetization when the x-axis is 5 [kOe].

<Specific Surface Area Increase Amount (ΔCS)×Magnetization After 3 Hours of Alkali Treatment>

For the hydrogen storage alloys (samples) obtained in Examples and Comparative Examples, using the specific surface area increase amount (ΔCS) and the magnetization after 3 hours of alkali treatment obtained by the measurement as described above, the value of the product of these (specific surface area increase amount (ΔCS)×magnetization after 3 hours of alkali treatment) was calculated.

A decrease in lifetime characteristics of batteries is caused by an increase in specific surface area due to cracking of hydrogen storage alloy particles and corrosion from the surface of the alloy, by repeating charge and discharge. Thus, the crack and the corrosion are simultaneously progressed to decrease the battery characteristics. Therefore, as a battery lifetime evaluation method for evaluating the influence of these synergistic effects, the value of the product of the specific surface area increase amount (ΔCS) and the magnetization after 3 hours of alkali treatment (specific surface area increase amount (ΔCS)×magnetization after 3 hours of alkali treatment) is used as a criterion for evaluation. It can be confirmed that, when the value of the (specific surface area increase amount (ΔCS)×magnetization after 3 hours of alkali treatment) is low, the lifetime characteristics of the battery are less likely to decrease.

TABLE 1

| | Composition (wt %) | | | | | | |
|---|---|---|---|---|---|---|---|
| | La | Ce | Mm | Ni | Co | Mn | Al |
| Example 1 | 25.53 | 5.74 | 31.27 | 59.32 | 0.66 | 7.40 | 1.35 |
| Example 2 | 25.62 | 5.76 | 31.38 | 60.16 | 0.00 | 6.79 | 1.67 |
| Example 3 | 25.68 | 5.77 | 31.45 | 60.33 | 0.00 | 6.31 | 1.91 |
| Example 4 | 25.70 | 5.77 | 31.47 | 60.36 | 0.00 | 6.19 | 1.98 |
| Example 5 | 25.71 | 5.78 | 31.49 | 60.40 | 0.00 | 6.07 | 2.04 |
| Example 6 | 25.71 | 5.78 | 31.49 | 59.73 | 0.67 | 6.07 | 2.04 |
| Example 7 | 25.80 | 5.80 | 31.60 | 60.61 | 0.00 | 5.40 | 2.39 |
| Example 8 | 25.84 | 5.81 | 31.64 | 60.69 | 0.00 | 5.15 | 2.52 |
| Example 9 | 25.54 | 5.74 | 31.28 | 60.67 | 0.00 | 6.03 | 2.02 |
| Example 10 | 25.89 | 5.82 | 31.71 | 60.13 | 0.00 | 6.11 | 2.05 |
| Comparative Example 1 | 25.18 | 5.66 | 30.84 | 59.15 | 0.00 | 10.01 | 0.00 |
| Comparative Example 2 | 25.18 | 5.66 | 30.84 | 59.15 | 0.00 | 10.01 | 0.00 |
| Comparative Example 3 | 25.53 | 5.74 | 31.27 | 59.98 | 0.00 | 7.40 | 1.35 |
| Comparative Example 4 | 25.84 | 5.81 | 31.64 | 60.69 | 0.00 | 5.15 | 2.52 |
| Comparative Example 5 | 25.18 | 5.66 | 30.84 | 59.15 | 0.00 | 10.01 | 0.00 |
| Example 11 | 25.88 | 5.75 | 31.63 | 59.49 | 1.34 | 5.39 | 2.15 |
| Example 12 | 25.78 | 5.73 | 31.51 | 59.48 | 1.07 | 5.94 | 2.00 |

TABLE 2

| | Composition [mol] | | | | | | | a-axis length | c-axis length | | Magnetization after 3 hours of alkali treatment | ΔC8 × magnetization after 3 hours of alkali treatment |
|---|---|---|---|---|---|---|---|---|---|---|---|---|
| | Mm | Ni | Co | Mn | Al | ABx | Al/Mn | [Å] | [Å] | c/a | [amu/g] | [(amu · m³)/(g · co)] |
| Example 1 | 1.00 | 4.50 | 0.05 | 0.60 | 0.22 | 5.369 | 0.37 | 5.02046 | 4.06676 | 0.61004 | 1.4098 | 0.2237 |
| Example 2 | 1.00 | 4.54 | 0.00 | 0.55 | 0.27 | 5.367 | 0.50 | 5.01637 | 4.06764 | 0.61067 | 1.4992 | 0.2529 |
| Example 3 | 1.00 | 4.55 | 0.00 | 0.51 | 0.31 | 5.369 | 0.62 | 5.01853 | 4.06510 | 0.61002 | 1.2426 | 0.2485 |
| Example 4 | 1.00 | 4.55 | 0.00 | 0.50 | 0.32 | 5.369 | 0.65 | 5.01718 | 4.06689 | 0.61059 | 1.2270 | 0.2225 |
| Example 5 | 1.00 | 4.55 | 0.00 | 0.49 | 0.33 | 5.369 | 0.66 | 5.01703 | 4.06617 | 0.61067 | 1.3677 | 0.2080 |
| Example 6 | 1.00 | 4.50 | 0.05 | 0.49 | 0.33 | 5.369 | 0.66 | 5.01752 | 4.06633 | 0.61062 | 1.4014 | 0.1658 |
| Example 7 | 1.00 | 4.55 | 0.00 | 0.43 | 0.39 | 5.370 | 0.90 | 5.01930 | 4.06356 | 0.60959 | 1.3166 | 0.2788 |
| Example 8 | 1.00 | 4.54 | 0.00 | 0.41 | 0.41 | 5.366 | 1.00 | 5.01912 | 4.06303 | 0.60951 | 1.1620 | 0.2722 |
| Example 9 | 1.00 | 4.60 | 0.00 | 0.49 | 0.33 | 5.419 | 0.66 | 5.01466 | 4.06726 | 0.61104 | 1.4047 | 0.1692 |
| Example 10 | 1.00 | 4.50 | 0.00 | 0.49 | 0.33 | 5.316 | 0.66 | 5.02023 | 4.06760 | 0.61024 | 1.3978 | 0.2998 |
| Comparative Example 1 | 1.00 | 4.55 | 0.00 | 0.62 | 0.00 | 5.369 | 0.00 | 5.02766 | 4.05910 | 0.60735 | 1.6394 | 0.6289 |
| Comparative Example 2 | 1.00 | 4.55 | 0.00 | 0.62 | 0.00 | 5.369 | 0.00 | 5.03010 | 4.05536 | 0.60622 | 1.6918 | 0.7601 |
| Comparative Example 3 | 1.00 | 4.55 | 0.00 | 0.60 | 0.22 | 5.369 | 0.37 | 5.02271 | 4.06330 | 0.60699 | 1.3944 | 0.4008 |
| Comparative Example 4 | 1.00 | 4.54 | 0.00 | 0.41 | 0.41 | 5.369 | 1.00 | 5.02147 | 4.06167 | 0.60690 | 1.4775 | 0.4004 |

TABLE 2-continued

| | Composition [mol] | | | | | | a-axis length [Å] | c-axis length [Å] | c/a | Magnetization after 3 hours of alkali treatment [amu/g] | ΔC8 × magnetization after 3 hours of alkali treatment [(amu · m³)/(g · co)] |
|---|---|---|---|---|---|---|---|---|---|---|---|
| | Mm | Ni | Co | Mn | Al | ABx | Al/Mn | | | | | |
| Comparative Example 5 | 1.00 | 4.55 | 0.00 | 0.62 | 0.00 | 5.369 | 0.00 | 5.02319 | 4.06604 | 0.60945 | 1.9520 | 0.5041 |
| Example 11 | 1.00 | 4.46 | 0.10 | 0.43 | 0.35 | 5.340 | 0.61 | 5.02052 | 4.06303 | 0.60926 | 1.5501 | 0.2764 |
| Example 12 | 1.00 | 4.48 | 0.06 | 0.48 | 0.33 | 5.360 | 0.66 | 5.01347 | 4.06556 | 0.61012 | 1.4143 | 0.2138 |

(Consideration)

The hydrogen storage alloys (samples) obtained in Examples and Comparative Examples were subjected to structural analysis by the X-ray diffraction method in the same manner as in the measurement of the a-axis length. It was confirmed that sufficient analysis accuracy was obtained in the space group of P6/mmm, and from the composition of the components obtained from the chemical analysis, the hydrogen storage alloys (samples) obtained in Examples and Comparative Examples all had a parent phase having an $AB_5$-type crystal structure.

From the results of the above Examples and the tests conducted by the present inventors so far, it was found that, when the Mm-Ni—Mn—Al—Co alloy-based $AB_5$-type hydrogen storage alloy was a hydrogen storage alloy having a low Co amount, that is, a molar ratio of Co of 0.11 or less when the molar ratio of Mm was 1.00, and using Mm composed of La and Ce, the ratio (Al/Mn) of the molar ratio of Al to the molar ratio of Mn when the molar ratio of Mm was 1.00 was preferably 0.35 to 1.10, in order to sufficiently lower the value of the "specific surface area increase amount× magnetization ratio after alkali treatment".

It was also found that the ratio of the c-axis length to the a-axis length was preferably 0.8092 or more, in order to sufficiently lower the value of the "specific surface area increase amount× magnetization ratio after alkali treatment".

Furthermore, it was found that ABx was more preferably 5.32 or more in that the value of the "specific surface area increase amount× magnetization ratio after alkali treatment" could be further lowered.

The invention claimed is:

1. A hydrogen storage alloy comprising a parent phase having a $CaCu_5$-type, that is, an $AB_5$-type crystal structure, the hydrogen storage alloy comprising an ABx composition constituted with an A-site consisting of a misch metal (referred to as "Mm") and a B-site consisting of Ni, Co, Mn, and Al, or Ni, Mn, and Al, wherein Mm consists of La and Ce;

a molar ratio of Co is 0.0 or more and 0.11 or less when a molar ratio of Mm is 1.00;

a ratio (Al/Mn) of a molar ratio of Al to a molar ratio of Mn is 0.35 to 1.10;

a ratio of a c-axis length to an a-axis length in the $CaCu_5$-type crystal structure is 0.8092 or more; and the hydrogen storage alloy is allowed to contain impurities at an amount of 0.05% by mass or less.

2. The hydrogen storage alloy according to claim 1, having a magnetization of 1.60 emu/g or less after performing a surface treatment, the surface treatment being performed by immersing a hydrogen storage alloy powder having a particle diameter adjusted such that a 50% volume cumulative particle diameter (D50) is 21 μm±2 μm, into a 31% by mass KOH aqueous solution having a liquid temperature of 120° C. for 3 hours.

3. The hydrogen storage alloy according to claim 1, wherein in the ABx composition, a total molar ratio (ABx) of elements constituting the B-site is 5.28 or more and 5.46 or less when the molar ratio of Mm constituting the A-site is 1.00.

4. A negative electrode active material for a nickel-hydrogen battery comprising the hydrogen storage alloy according to claim 1.

5. A nickel-hydrogen battery using the negative electrode active material according to claim 4.

6. A nickel-hydrogen battery being mounted on an electric vehicle or a hybrid electric vehicle, the battery using the negative electrode active material according to claim 4.

* * * * *